Aug. 4, 1931.  L. S. HARBER  1,816,844
DOUGH MOLDING MACHINE
Filed June 1, 1927  2 Sheets-Sheet 2
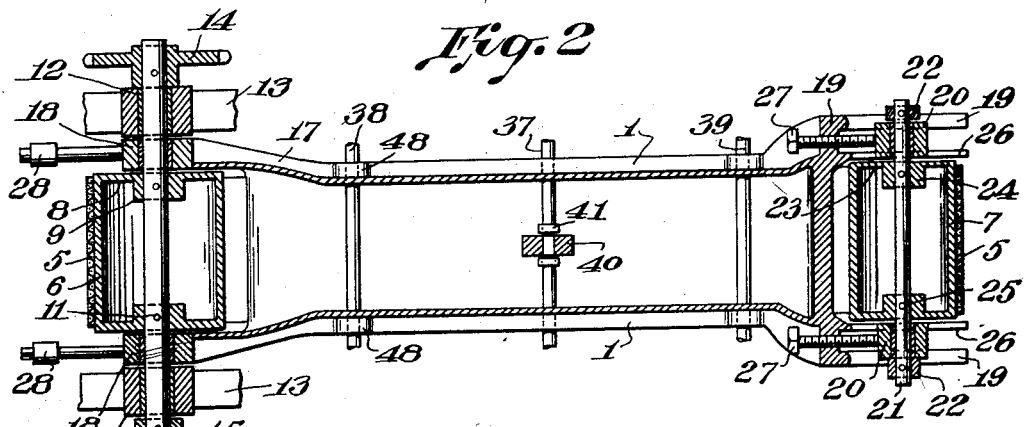
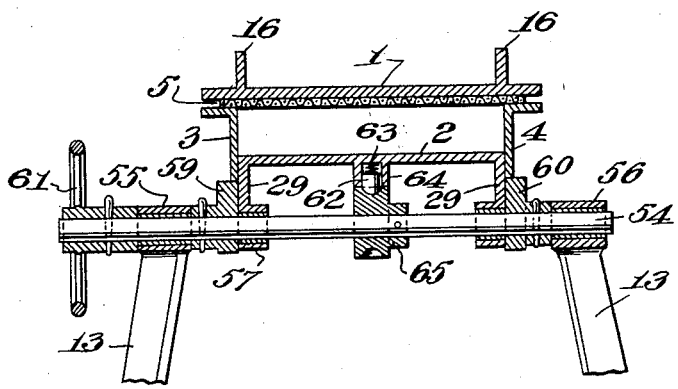
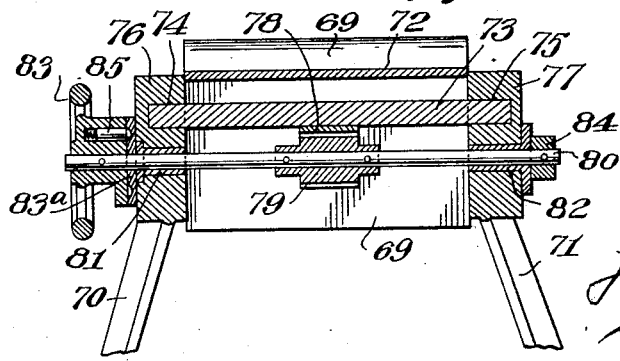

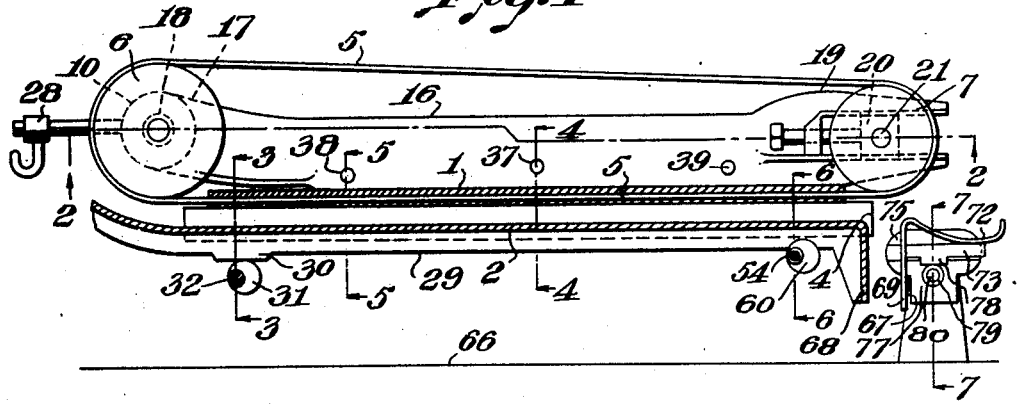

Patented Aug. 4, 1931

1,816,844

UNITED STATES PATENT OFFICE

LAURENCE SEYMOUR HARBER, OF PETERBOROUGH, ENGLAND, ASSIGNOR TO BAKER PERKINS COMPANY, INCORPORATED, OF SAGINAW, MICHIGAN, A CORPORATION OF NEW YORK

DOUGH MOLDING MACHINE

Application filed June 1, 1927. Serial No. 195,742.

This invention relates to dough molding machines and more particularly to dough molding machines of the type in which a sheet of dough is coiled into a spiral roll and molded into a loaf of the desired size and shape.

One object of the present invention is to improve the construction and mode of operation of dough molding machines and to provide such machines with mechanism which will effect a better molding operation than prior machines.

A piece of dough entering the loaf-forming channel of a molding machine, should first be subjected to sufficient pressure to seal the surface so that its mass is completely surrounded by an unbroken and uninterrupted elastic skin. This skin is frequently delicate and incapable of resisting further stretching and it is, therefore, important to diminish the pressure accordingly during the further travel of the loaf through the molding machine. In the present machine, the pressure on the piece of dough is diminished automatically and gradually from the inlet to the outlet of the molding channel.

A feature of the present invention consists in the provision, in a machine of the character above outlined, of means for adjusting the pressure to which the dough is subjected upon entering the molding channel.

Another feature of the invention consists in the provision of side walls for the molding channel arranged for relative adjustment laterally of the channel. This adjustment enables the width of the channel and thereby the length of the molded loaves to be varied. In the present machine, the side walls of the molding channel extend outwardly from the channel beyond the molding surface of one of the molding plates, the side walls engaging the side edges of this plate. To compensate for any relative adjustment of the side walls the latter pressure plate may be replaced by other plates of different widths.

Another feature of the invention relates to the provision of means for adjusting the pressure exerted upon the dough throughout its passage through the molding mechanism. This pressure is preferably produced by gravity action so that a yielding pressure results and the adjustment of this pressure enables just the right action to be secured to mold the dough properly without injuring the dough.

Certain other features of the invention relate to means for preventing abnormally large molded loaves or two adhering molded loaves from being discharged from the dough-molding mechanism upon the dough receiving means. In the present construction, such preventing means is arranged to separate the abnormally large loaves or adhering loaves from the other loaves and cause the same to be discharged into a special receptacle.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown. In the drawings—

Fig. 1 is a longitudinal view in vertical section of a mechanism embodying the invention;

Fig. 2 is a view in horizontal section of the mechanism shown in Fig. 1, taken substantially on the line 2—2 of Fig. 1;

Fig. 3 is a view in vertical section of a portion of the mechanism shown in Fig. 1, said view being taken substantially on the line 3—3 of Fig. 1;

Fig. 4 is a view in vertical section of a portion of the mechanism shown in Fig. 1, taken substantially on the line 4—4 of Fig. 1;

Fig. 5 is a view in vertical section of a portion of the mechanism shown in Fig. 1 taken substantially on the line 5—5 of Fig. 1;

Fig. 6 is a view in vertical section of a portion of the mechanism shown in Fig. 1 taken substantially on the line 6—6 of said figure; and Fig. 7 is a view in vertical section of the discharge chute structure taken substantially on the line 7—7 of Fig. 1.

The dough molding mechanism shown in the drawings of this application is intended for use in connection with mechanism for rolling batches of dough into a sheet and then coiling this sheet into the form of a spiral and delivering the same to the present mechanism. The present mechanism may be advantageously used in connection with a dough-rolling mechanism of the general type disclosed in applicant's co-pending application, Serial No. 21,763 filed April 9, 1925. The dough-molding mechanism of the present invention was designed as an improvement on the dough-molding mechanism shown and described in applicant's co-pending application referred to above.

The dough-molding mechanism illustrated in the drawings comprises an upper pressure plate 1, a lower pressure plate 2 spaced from said upper plate and side plates 3 and 4 arranged to form a molding channel, the pressure plates 1 and 2 forming the upper and lower walls of the channel and the plates 3 and 4 forming the side walls of the channel. The dough is impelled through this molding channel by means of an endless belt 5 passing underneath the upper molding plate 1. In the present mechanism, the coiled pieces of dough are carried into the molding channel at the left-hand end thereof and the belt 5 is driven in the direction of the arrow in Fig. 1. The belt 5 passes about the hollow roller 6 located at the entrance end of the molding channel and about the hollow roller 7 located at the outlet end of said channel. The roller 6 is rotatably mounted upon a shaft 10, the roller being secured to the shaft by means of pins 11 driven through the bosses 9 extending within the roller and through the shaft. The shaft 10 is rotatably mounted in bearings 12 formed on the frame 13 of the machine and the shaft is driven by means of a sprocket wheel 14 rigidly fixed to one end of the shaft. The shaft is held in position longitudinally by the engagement of the sprocket 14 with the frame and by the engagement of a collar 15 fixed to the opposite ends of the shaft with said frame.

The upper pressure plate is mounted for movement toward and from the lower pressure plate and is acted upon by gravity which causes the same to exert a yielding pressure on the dough as it passes through the molding channel. In order that the dough may be subjected to a gradually diminishing pressure as it passes through the molding channel, the upper pressure plate is pivoted upon a substantially horizontal axis located adjacent the entrance end of the molding channel to swing vertically toward and from the lower molding plate. As shown in the drawings, the upper pressure plate is formed with side ribs 16 and with arms 17 at one end thereof which embrace the roller 6 and are provided with bearings 18 in which the shaft 10 engages. Thus the upper molding plate is pivotally supported upon the shaft 10. At the outlet end of the molding channel, the pressure plate 1 is provided with two sets of arms embracing the ends of the roller 7 and provided with slots in which are mounted bearings for the shaft which carries said roller. Each set of these arms comprises an outer arm 19 and an inner arm 26, each formed with slots and in said slots is adjustably mounted a bearing block 20 in which one end of the shaft 21 is journaled. Upon the shaft 21 is secured the roller 7 by means of pins 25 passing through inwardly extending bosses 24 and through the shaft. This construction enables the shaft 21 to be adjusted longitudinally of the upper pressure plate to regulate the tension on the belt. The bearings are adjusted by means of screws 27 threaded into the frame of the upper molding plate and engaging the bearing blocks 20. The shaft 21 is held in position longitudinally within the bearings 20 by means of collars 22 secured to the shaft and arranged to engage said bearings.

In the construction above described, the pieces of dough passing through the molding channel are subjected to the pressure produced by gravitational action upon the upper molding plate, the belt 5 and the parts which swing with the same about the shaft 10. In order to diminish this pressure, if the weight of the parts which swing about the shaft 10 is such as to subject the dough to a pressure too heavy for efficient molding of the same under certain conditions, the frame of the upper molding plate is provided with arms or bars 28 extending from the shaft 10 in a direction opposite to that in which the molding plate extends, and these bars are provided respectively with hooks arranged to receive counterweights of any desired mass. Thus, these weights will partially counterbalance the weight of the upper pressure plate 1 and the parts at the right of the axis of the shaft 10 (Figure 1) which move about the shaft with said plate.

As stated above, the pieces of dough entering the loaf forming or molding channel should first be subjected to sufficient pressure to seal the surface of the dough so that its mass is completely surrounded by an uninterrupted and unbroken elastic skin. The pressure required to secure this result may vary with different dough compositions and under different conditions. It is, therefore, desirable that the operator should be able to adjust the pressure exerted upon the dough when it enters the dough molding channel. To this end, in the present machine, the left hand end of the lower pressure plate is adjustable vertically toward and from the upper pressure plate. The lower pressure plate is provided with side flanges 29 having reinforcements 30 which engage eccentrics 31 fixed to a shaft 32 rotatably mounted in bearings 33 on the frame of the machine. The shaft 32 carries a hand wheel 34 rigidly secured to one end of the shaft and the shaft is held in adjusted position by means of a spring-pressed locking pin 36 mounted in the hand wheel and arranged to engage any one of a series of recesses in the disc 36a attached to the frame. Thus by rotatably adjusting the hand wheel 34, the eccentrics 31 may be adjusted to raise or lower the end of the pressure plate 2 adjacent the entrance end of the molding channel.

In order to vary the width of the molding channel and thereby vary the length of the loaves molded therein, the side walls 3 and 4 are mounted for adjustment laterally of the molding channel. The side walls of the channel in the present construction overlap the side flanges 29 on the lower pressure plate 2. To compensate for any adjustment of the side walls laterally of the molding channel, a lower pressure plate of a different width should be substituted for the lower pressure plate employed prior to this adjustment. The side walls 3 and 4 of the molding channel are attached to brackets 45, 46, 52 and 53 suspended from shafts 37, 38 and 39 extending across the upper pressure plate. The brackets 52 and 53 are slidably mounted on the shafts 38 and 39 which are secured within bosses 48 upon the upper pressure plate. The shaft 37 is rotatably mounted in a bearing in a boss 40 formed in the upper pressure plate and is held from longitudinal movement therein by means of collars 41 secured to the shaft on opposite sides of the boss. Shaft 37 passes through openings 42 in the ribs 16 of the upper pressure plate 1 and is formed with threaded end portions 43 and 44 engaging in threaded openings in the brackets 45 and 46. A hand wheel 47 is attached to the left-hand end of the shaft 37 (Figure 4) for rotating the shaft. As shown clearly in Figure 4, the threaded portions 43 and 44 on the shaft 37 are formed respectively with right and left-hand threads so that the rotation of the shaft will adjust the brackets 45 and 46 and the side walls 3 and 4 of the molding channel toward and from each other. As shown clearly in the drawings, the side walls 3 and 4 are right-angular in cross section and these walls are suspended from the upper pressure plate 1 with just sufficient clearance provided between the upper portions of the side walls and the upper pressure plate to allow the edges of the belt 5 to engage and move readily between the same. The side walls thus form guides for the marginal portions of the belt which moves freely between the upper pressure plate and the upper flanges of the side walls and is in contact at its margin, or substantially in contact with both side walls and plate.

The pieces of dough which have been rolled into a sheet and coiled into spiral form by the dough sheeting and coiling mechanism, are fed into the left-hand end of the molding channel (Figure 1) and are passed through the channel by the action of the belt 5. As a piece of dough enters the molding channel, it is subjected to sufficient pressure to seal the surface thereof so that the entire mass of dough is substantially completely surrounded by an unbroken and uninterrupted elastic skin. This pressure is produced by the passage of the piece of dough between the forward end of the lower pressure plate and the belt 5 at the point where said belt extends about the roller 6. The lower pressure plate and the roller are relatively immovable away from each other so that the dough is subjected to the greatest pressure as it enters the molding channel. As a piece of dough is rolled through the molding channel by the action of the belt, the belt and the upper pressure plate are supported by the piece of dough. Therefore, as the dough passes through the channel, pressure is exerted on the same, produced by the action of gravity on the belt 5, the pressure plate and the parts supported on the plate and located at the right of the axis of the shaft 10, Fig. 1. This pressure, however, produced by gravity, gradually diminishes as the piece of dough progresses toward the discharge end of the molding channel on account of the diminution in leverage which is greatest just as the dough passes to the right of the axis of the shaft 10 and gradually diminishes as the dough piece moves toward the discharge end of the channel. The elastic skin formed on the dough piece as it enters the molding channel is delicate and often incapable of resisting further stretching. This gradual diminution in pressure is, therefore, an important feature in that it greatly reduces the liability of breaking the skin of the dough piece during the rolling operation.

At a point adjacent the discharge end of the molding channel, means is provided for limiting the downward movement of the upper pressure plate and the pressure roll 7. This means is arranged for adjustment to adjust the height of the molding channel in accordance with the requirements of the dough pieces to be molded.

In the construction shown, a shaft 54 extending across the underside of the lower molding plate is rotatably mounted in bearings 55 and 56 on the frame of the machine. This shaft supports the discharge end of the lower molding plate which is provided with bearings 57 and 58 journaled on said shaft. Upon the shaft 54 is secured eccentrics 59 and 60 which are arranged to engage respectively the lower edges of the side walls 3 and 4 of the molding channel. These side walls are attached to the upper molding plate in the manner described above and are movable vertically therewith. The engagement of the lower edges of the side walls 3 and 4 with the eccentrics 59 and 60, therefore, limits the downward movement of the upper pressure plate and the pressure roll 7. The shaft 54 is provided at its left-hand end, Fig. 6, with a hand-wheel 61 for rotating the shaft. The shaft is arranged to be locked in adjusted position by means of a plunger 62 actuated by a spring 63 and arranged to engage in any one of a series of recesses in a locking disc 65 fixed to the shaft 54. The molded loaves of dough are usually discharged from the molding channel upon a conveyor or into pans controlled by a pan-filling apparatus or the like.

This machine is also provided with mechanism for preventing two adhering loaves of dough or an abnormally large loaf from being discharged from the machine into the receiving pans or upon the loaf-receiving conveyor. In the present construction, this mechanism comprises a discharge chute extending downwardly at an angle to the molding channel at the discharge end of the channel. One side of this chute is formed by a plate or wall 68 extending downwardly from the discharge end of the lower pressure plate 2 and preferably formed integral with said plate. The other side of the discharge chute is formed by a plate or wall 69 preferably arranged parallel with the plate or wall 68 and spaced from said plate at a distance suitable for the reception of the molded loaves within the discharge chute. The upper portion of the plate or wall 69 preferably extends upwardly to a point slightly above the plane of the upper surface of the lower pressure plate as shown clearly in Fig. 1 and is connected with a receptacle 72 arranged beyond the discharge chute in the direction of feed of the molding mechanism. The plate or wall 69 in the present construction is arranged for adjustment toward and from the plate or wall 68 to adjust the width of the discharge chute for loaves of different sizes. As shown particularly in Figs. 1 and 7 of the drawings, the plate or wall 69 and the receptacle 72 attached thereto are both mounted upon a slide 73, the ends of which engage in horizontal guides 74 and 75 in blocks 76 and 77 mounted upon the upper ends of the standards 70 and 71. The slide 73 carries at its underside a rack 78 meshing with a gear wheel 79 fixed on a rotatable shaft 80, the ends of which engage in bearings 81 and 82 secured in the blocks 76 and 77. The shaft 80 carries at one end a collar 84 secured thereto and arranged to engage the bearing 82 and to the other end of the shaft is secured a hand-wheel 83 engaging a flange 83a formed on the bearing 81. By the rotation of the shaft 80 produced by a manipulation of the hand-wheel 83, the slide 73 is adjusted in the guides 74 and 75 to adjust the plate or wall 69 toward and from the plate or wall 68. Thus the width of the discharge chute may be adjusted to correspond with adjustments in the height of the molding channel as determined by the devices at the forward end of the lower pressure plate for adjusting the vertical position of this end of the plate and the devices at the rear or discharge end of said plate for determining the lower limiting position of the upper plate. As will be noted from an inspection of Fig. 1 of the drawings, the discharge chute is directly below the pressure roller 7 over which the belt 5 passes at the discharge end of the molding channel.

With this construction, any loaves too large to pass from the discharge chute and any two loaves adhering together upon reaching the discharge end of the molding channel will engage the upper portion of the plate 69 and will then be carried by the belt 5 over the upper portion of said plate into the receptacle 72. Single loaves of normal size, however, upon reaching the discharge end of the molding channel will immediately drop down through the discharge chute.

It is to be understood that the terms "upper" and "lower", as applied to the pressure plates 1 and 2 throughout the foregoing specification, are merely relative terms, and are not to be construed as limiting the invention to the use of pressure plates in the position herein shown, since it will be obvious that pressure plates may be employed in other positions without departing from the spirit of the invention.

It is to be understood that the invention is not limited to the particular construction and arrangement of parts of the illustrated embodiment of the invention, but that the invention may be embodied in other forms within the scope of the claims.

Having explained the nature and object of the invention and having specifically described a machine embodying the invention in its preferred form, what is claimed is:

1. A dough molding machine having in combination, a pressure plate, a belt running across said plate, a second pressure plate between which and the belt the dough is rolled, means for yieldingly pressing said plates toward each other, means by which the distance of said plates from each other may be adjusted at the ends of said plates at which the dough enters, and adjustable stop means for limiting definitely the movement of the discharge end of one of said plates toward the other plate.

2. A dough molding machine having in combination, loaf molding means along which a mass of dough is impelled by a rotary movement of said mass to form a loaf, a discharge chute extending downwardly at an angle to the direction of movement to the dough along said means for receiving the molded dough after the completion of the molding operation, and means for adjusting the width of said chute.

3. A dough molding machine having in combination, means forming a loaf molding channel along which a mass of dough is impelled by a rotary movement of said mass to form a loaf, a discharge chute extending downwardly at an angle to said channel for receiving the molded dough after the completion of the molding operation, a dough-impelling means located along the upper portion of said channel, said impelling means extending across the upper end of said chute.

4. A dough molding machine having in combination, means for molding pieces of dough into substantially cylindrical loaves, and means for separating abnormally large molded loaves or adhering molded loaves from single molded loaves of normal size.

5. A dough moulding machine having in combination, means for molding pieces of dough into substantially cylindrical loaves, and means for separating abnormally large molded loaves or adhering molded loaves from single molded loaves of normal size and discharging the same into a separate receptacle.

6. A dough molding machine having in combination, means for molding pieces of dough into substantially cylindrical loaves, a discharge passage through which molded loaves of normal size are discharged, and means for preventing abnormally large molded loaves or adhering molded loaves from passing through said passage and for discharging the same at a separate point.

7. A dough molding machine having in combination a pressure plate, a pivotally mounted pressure plate opposed thereto, an endless belt running on said pivotally mounted pressure plate, the dough being molded in the space between the belt and the other pressure plate, side walls extending along the opposite sides of said dough molding space, and supports provided on the said pivoted pressure plate to carry the side walls.

8. A dough molding machine having in combination a pressure plate, a yieldingly mounted pressure plate opposed thereto, an endless belt running on one of said pressure plates, the dough being molded in the space between the said belt and the other pressure plate, side walls extending to the said belt and beyond the side edges of said other plate, and means provided on one of the plates to support said walls and to regulate their distance from each other.

9. A dough molding machine having in combination, dough molding means along which the dough is rolled, a chute extending downwardly at an angle to the direction of movement of the dough along said means for receiving the dough after the completion of the molding operation, means for adjusting the width of said chute for determining the maximum size of molded loaf passing therethrough and a receptacle for receiving the molded loaves too large to pass through said chute.

10. A dough molding machine having in combination, a lower pressure plate, an upper pressure plate, means for impelling the dough to be molded between said pressure plates, and a discharge chute arranged to extend in a downward direction and positioned at the discharge end of said pressure plates, said chute comprising relatively adjustable walls whereby only single loaves of normal size can pass therethrough.

11. A dough molding machine having in combination a lower pressure plate, an upper pressure plate, means for impelling the dough to be molded between said pressure plates, a chute arranged to extend in a downward direction and positioned at the discharge end of said pressure plates, said chute comprising two opposed side walls, one of which is carried by the lower pressure plate, and means for regulating the distance of the other wall of said chute from said first wall thereof so that only single loaves of normal size can pass therethrough, while loaves of larger size are forced over the top edge of the latter wall of the chute.

12. A dough molding machine having in combination a lower pressure plate, an upper pressure plate, and side walls forming a dough molding channel, means for impelling pieces of dough through said channel, a discharge chute comprising two spaced side walls extending downwardly from said channel, means for adjustably supporting one of said walls, whereby the width of the chute may be adjusted to determine the size of the molded loaves passing through said chute, and a receptacle attached to the latter side wall to receive abnormally large loaves.

13. A dough molding machine having in combination, opposed walls forming a molding channel, means for rolling the dough between said walls, means for yieldingly pressing said walls towards each other, and means arranged to receive molded loaves from said molding channel for separating abnormally large loaves or adhering loaves from single loaves of normal size.

14. A dough molding machine of the type described having in combination a lower pressure plate, an upper pressure plate pivotally mounted at the entrance of the dough molding channel, an endless belt running on said upper plate, side walls enclosing the space between the lower run of the belt and the said lower plate and extending below the side edges of the latter, means located adjacent the entrance of the dough molding channel for adjusting the position of the said lower plate to regulate the distance of the said lower plate from the said belt, and adjustable means located adjacent the exit of the dough molding channel for engaging the said side walls to limit the distance of the lower plate from the said belt.

15. A dough molding machine of the type described having in combination an upper pressure plate, a belt running on said plate, a lower pressure plate, between which and the said belt the dough pieces are rolled, means for pivotally supporting the said upper plate for movement toward and from the said lower plate, the said pivoted upper plate being pressed toward the said lower plate by gravity, and means for adjusting the pressure of said pivoted upper plate on the dough pieces by counterbalancing this plate to the required degree.

16. A dough molding machine of the type described having in combination a lower pressure plate, an upper pressure plate pivotally arranged above the said lower plate and forming a channel between said pressure plates, means for impelling the dough pieces through said channel, a receptacle, a chute consisting of two parallel spaced plates extending downwards, the inner of which is connected with the exit end of the lower pressure plate, a receptacle carried by the outer plate, supporting means for the outer plate, and means for adjusting the distance of the outer plate from the inner plate and the receptacle therewith so that only single loaves of normal size can pass through said chute and those of larger size drop over the top edge of the outer plate thereof into the said receptacle.

17. A dough molding machine having in combination opposed upper and lower walls forming a molding channel between which walls pieces of dough are rolled to mold the same into loaf form, and means arranged to receive the molded loaves from said molding channel for separating abnormally large loaves or adhering loaves from single loaves of normal size.

LAURENCE SEYMOUR HARBER.